even if only in small quantities, but which no longer deserves to be described as a porous pulverulent state.

UNITED STATES PATENT OFFICE.

JACOB STAUDT, OF BONN, GERMANY.

PROCESS FOR MANUFACTURING ARTIFICIAL STONE.

No. 850,689. Specification of Letters Patent. Patented April 16, 1907.

Application filed August 6, 1906. Serial No. 329,469.

*To all whom it may concern:*

Be it known that I, JACOB STAUDT, chemist, a subject of the German Emperor, residing at Bonn-on-the-Rhine, 57 Lessingstrasse, Germany, have invented certain new and useful Improvements in Processes for Manufacturing Artificial Stone; and I do hereby declare the following to be a full, clear, and exact description of the invention, such as will enable others skilled in the art to which it appertains to make and use the same.

It has previously been proposed to effect rapid manufacture of artificial stone from pulverized materials by using as a binding agent oils, fats, and the like, which have the property of hardening in thin layers in the air at an ordinary or increased temperature. In this process the solid filling substances moistened with the binding agents are exposed to the action of air at ordinary or increased temperature in a porous pulverulent state, the whole mass becoming solidified to such an extent that after a short time it can be compressed into blocks, which quickly harden or set by heating to a temperature up to 200° centigrade.

It has been found that the addition of certain resinous substances considerably improves this process both as regards the time required for solidifying the pulverulent material which forms the intermediate product and as regards the mechanical properties of the finished product.

Certain classes of resinous substances can be dissolved in the fats and oily binding substances used in the process above referred to, and such substances act in the solution "catalytically" by readily absorbing oxygen from the air and transferring it to the oily and fatty binding substances in such a manner that its chemical action is increased and rendered more intense—that is to say, the chemical reaction is accelerated. This is of course more particularly the case when large surfaces of these solutions are exposed to the air. The use of such additions has therefore been found specially advantageous in the process referred to where the "solidification" of the binding substances effected by the oxygen of the air has formed an essential feature in the utilization of a pulverulent intermediate product in the manufacture of artificial stone. If such resinous substances are added to the binding substances of the mixtures in the known process, then the porous pulverulent state of the mixture, which offers an exceedingly large surface to the access of air, greatly assists the catalytic action, so that the chemical processes take place in a very intense manner. Mixtures prepared with such additions when left exposed in a mass to the air at an ordinary temperature soon become heated to about 100° centigrade merely under the influence of the intense chemical changes. The reaction becomes still more intense if the temperature is at the same time artificially raised. Besides this essential improvement and acceleration of the solidifying process itself the blocks thus produced, in addition to a greater hardness as compared to the blocks produced by the previously-known process, have a very great mechanical strength, so that they readily resist heavy blows with a hammer. As all resinous substances are bad conductors of electricity, the products prepared by the process according to this invention are very suitable for electrotechnical purposes, in which the substances must be strong mechanically and have great insulating power.

Another advantage of the process described consists in the fact that blocks produced by it possess a fair amount of strength and toughness even before hardening, so that injury to them during transport from the press to the hardening-chamber and during the manipulation necessary during the compression—such as removal from the press-mold, cleaning off the bur produced during the pressing, and the like—is obviated.

Compared to the known process the present process has the following advantages: The solidifying process is accelerated by the catalytic action of the added resinous substances. The quantity of fluid binding substance to be solidified is reduced, owing to its being partly replaced by solid resins. The time occupied by the solidifying process is therefore also reduced, owing to the above substitution.

As compared to the articles produced by the previous process the blocks produced according to the present invention have the following advantages: They can be easily transported before hardening without any danger of their crumbling to pieces. The finished blocks are harder, stronger, and eminently suitable for use for electrotechnical purposes, owing to the fact that resins are very bad conductors of electricity.

Among the resinous substances which have the necessary property of acting as catalytic agents for the binding substances employed in the known process are the following: 1, true resins soluble in the binding mediums in question, such as colophony, pine resin, dammara resin or kauri gum, copal, amber, and the like; 2, various resinous artificial products which are prepared by different processes from resins, as well as resinous acids and fatty acids in combination with metallic oxides, and also alcohols and other hydrocarbon compounds with or without oxygen treatment, known as hard resin, copal substitute, shellac substitute, resinate, resin-acid ester, varnish ester, varnish preparations, solid driers, and similar names, and which are all soluble in the binding substances in question. All those substances enumerated under headings 1 and 2 are resinous in nature and catalytic in action.

Several processes are well known for manufacturing masses which, in addition to filling substances and resins, contain also oil, wax, or the like; but the processes in question do not affect the substance of this invention, as the masses produced by the former cannot possibly be compared with the mass according to this invention as regards the purpose and the properties, for in those processes a cement softened to a greater or less extent by melting is always obtained as an intermediate product, and as appears from the specifications of the said processes should be obtained, since the method of working requires the use of a mass which can be again reduced to a molten or softened state. The products obtained by the present process are, however, on the contrary, hardened by heating and must not and do not melt. This is effected by the thorough chemical action of the oxygen of the air on the material to be compressed, this action being due to the solidifying in a porous pulverulent state. This action further renders the final and thoroughly-uniform hardening of the blocks possible at temperatures up to 200°, as stated in the previously-known process referred to. Again, in other processes hitherto known the method of working makes the action of air on the mixed mass impossible, owing to their plastic nature, or renders such action possible only in a very superficial and practically negligible manner. Such processes can lead only to final products which cannot stand any appreciable increase of temperature without their again becoming soft.

In order to combine resinous substances with the binding substances, the former are either dissolved in heated binding substances or the resinous substances can be added to the binding substances after the former have been dissolved in volatile solvents. Such solutions can be obtained on the market ready prepared under the name of "liquid driers," "drier extracts," and the like. As regards the quantity to be added to the binding substances it can of course be made as small as desired, but then the action is correspondingly weaker. Very good results are obtained with additions of thirty to fifty per cent., but greater proportions can also be used, according to the binding substances and additions employed. The limit is fixed by the condition that the binding substance must be able to dissolve the quantity of the resinous substance added and the solution must be capable of being converted advantageously into a moist loose powder when mixed with the solid substances. This is the case when the mixture in a cold state is already consistent, but can be rendered sufficiently thin by heating to enable it to be mixed with the solid substances. The correct proportion of the mixture must be fixed for each resinous substance and for each binding medium by experiment. For the remainder of the process the description of the process in the American Patent No. 797,624 and German Patent No. 162,858 will apply, and also all filling substances and binding substances described in the said patent can be used for the process according to this invention. As an example, fifty per cent. of a resin or resinate may be dissolved in linseed-oil, a powder consisting of three parts of ground quartz-sand and two parts of pulverized clay is moistened with seventeen per cent. of the said mixture, and the moist porous powder solidified at 120 to 130° centigrade and pressed into blocks, which are then hardened at a temperature of 150° to 180° centigrade.

Having thus described the nature of my said invention and the best means I know of carrying the same into practical effect, I claim—

1. The process of manufacturing artificial stone which consists in mixing a resinous substance, having catalytic properties with an oily or fatty binding agent and a pulverized filling substance in quantity sufficient to produce a moist and porous mixture, exposing the mixture as a thin layer to the action of the air until solidification occurs, then pressing the solidified powder into objects of the required shape and subjecting them to a temperature not exceeding 200° centigrade.

2. The process of manufacturing artificial stone, which consists in mixing a dissolved resinous substance, having catalytic properties with an oily or fatty binding agent and a pulverized filling substance in quantity sufficient to produce a moist and porous mixture, exposing the mixture as a thin layer to the action of the air and at an elevated temperature of 100° to 130° centigrade until solidification occurs, then pressing the solidified powder into objects of the required shape and subjecting them to a temperature not exceeding 200° centigrade.

3. The process of manufacturing artificial stone, which consists in dissolving a resinous substance, having catalytic properties in linseed-oil, adding a pulverized filling substance in quantity sufficient to produce a moist and porous mixture, exposing the mixture as a thin layer to the action of the air until solidification of the required shape and subjecting them to a temperature not exceeding 200° centigrade.

4. The process of manufacturing artificial stone, which consists in mixing a resinous substance, having catalytic properties with linseed-oil and ground quartz-sand and pulverized clay in quantity sufficient to produce a moist and porous mixture exposing the mixture as a thin layer to the action of the air at an elevated temperature of 100° to 130° centigrade, during fifteen to twenty minutes, then pressing the solidified powder into objects of the required shape and hardening them at a temperature not exceeding 200° centigrade.

In testimony whereof I have affixed my signature in presence of two witnesses.

JACOB STAUDT.

Witnesses:
 LOUIS VANDORN,
 HELENE MIDDERHOFF.